United States Patent
Liu et al.

(10) Patent No.: US 9,984,256 B2
(45) Date of Patent: May 29, 2018

(54) STORAGE DEVICE TAMPERING DETECTION

(71) Applicants: SEAGATE TECHNOLOGY LLC, Cupertino, CA (US); Hong Liu, Jiangsu (CN); Abhay Kataria, Longmont, CO (US); Chao Chen, Jiangsu (CN); WeiWei Feng, Jiangsu (CN); Monty Forehand, Loveland, CO (US); William Erik Anderson, Longmont, CO (US)

(72) Inventors: Hong Liu, SuZhou (CN); Abhay Kataria, Longmont, CO (US); Chao Chen, WuXi (CN); WeiWei Feng, SuZhou (CN); Monty A. Forehand, Loveland, CO (US); William Erik Anderson, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 210 days.

(21) Appl. No.: 14/900,962

(22) PCT Filed: May 15, 2014

(86) PCT No.: PCT/CN2014/077552
§ 371 (c)(1),
(2) Date: Dec. 22, 2015

(87) PCT Pub. No.: WO2015/172352
PCT Pub. Date: Nov. 19, 2015

(65) Prior Publication Data
US 2017/0323121 A1    Nov. 9, 2017

(51) Int. Cl.
*G06F 1/26* (2006.01)
*G06F 11/00* (2006.01)
(Continued)

(52) U.S. Cl.
CPC .............. *G06F 21/73* (2013.01); *G06F 21/57* (2013.01); *G06F 21/79* (2013.01); *G06F 21/80* (2013.01); *G06F 21/86* (2013.01)

(58) Field of Classification Search
CPC .......... G06F 21/73; G06F 21/57; G06F 21/79; G06F 21/80; G06F 21/86
(Continued)

(56) References Cited

U.S. PATENT DOCUMENTS

| 4,982,430 A | 1/1991 | Frezza et al. |
| 5,544,246 A | 8/1996 | Mandelbaum et al. |

(Continued)

FOREIGN PATENT DOCUMENTS

| CN | 1728162 A | 2/2006 |
| CN | 1741042 A | 3/2006 |
| CN | 102427449 A | 4/2012 |

OTHER PUBLICATIONS

Kristin Adair Nixon; Spoof Detection Schemes; Springer 2008; p. 404-423.*

(Continued)

*Primary Examiner* — Monjour Rahim
(74) *Attorney, Agent, or Firm* — Hall Estill Attorneys at Law (57) ABSTRACT

Apparatus and method for detecting unauthorized tampering with a data storage device having a housing and a memory. A first identifier value is stored on an external surface of the housing and a second identifier value is stored within the memory. The first and second identifier values are combined in a predetermined order to form a combined identifier value for which a digital signature is generated using a private key, and the digital signature is stored on the storage device. The digital signature, the first and second identifier values, and one or more dummy identification values are retrieved from (Continued)

the storage device and stored in a memory of a verification device, which combines the retrieved first and second identifier values in the predetermined order to generate a retrieved combined identifier value. The storage device is authenticated using the retrieved combined identifier value, the digital signature and a public key.

20 Claims, 7 Drawing Sheets (51) Int. Cl.
  *G08B 13/00* (2006.01)
  *G08B 21/00* (2006.01)
  *G08B 29/00* (2006.01)
  *G06F 21/73* (2013.01)
  *G06F 21/57* (2013.01)
  *G06F 21/86* (2013.01)
  *G06F 21/79* (2013.01)
  *G06F 21/80* (2013.01)

(58) Field of Classification Search
  USPC ............................................................ 726/84
  See application file for complete search history.

(56) References Cited

U.S. PATENT DOCUMENTS

| | | | |
|---|---|---|---|
| 5,991,876 A | 11/1999 | Johnson et al. | |
| 6,185,678 B1 | 2/2001 | Arbaugh et al. | |
| 6,263,413 B1 | 7/2001 | Motomura et al. | |
| 6,263,431 B1 | 7/2001 | Lovelace et al. | |
| 6,345,001 B1 | 2/2002 | Mokhlesi | |
| 6,424,717 B1 | 7/2002 | Pinder et al. | |
| 7,051,205 B1* | 5/2006 | Horiguchi | G06K 19/07749 713/168 |
| 7,139,915 B2 | 11/2006 | Detreville | |
| 7,313,690 B2 | 12/2007 | Miller | |
| 7,330,328 B2 | 2/2008 | Xie et al. | |
| 7,814,337 B2* | 10/2010 | Lee | G06F 21/79 713/162 |
| 8,200,989 B2* | 6/2012 | Kim | G06F 21/79 713/182 |
| 8,254,568 B2* | 8/2012 | Smith | G06F 21/57 380/277 |
| 8,291,226 B2* | 10/2012 | Chun | G06F 21/575 711/103 |
| 8,376,133 B2 | 2/2013 | Macor | |
| 8,391,495 B2 | 3/2013 | McLane et al. | |
| 8,447,977 B2 | 5/2013 | Slick et al. | |
| 8,495,118 B2 | 7/2013 | Wang et al. | |
| 8,526,605 B2 | 9/2013 | Matthews, Jr. | |
| 8,566,377 B2 | 10/2013 | Harris et al. | |
| 8,583,711 B2 | 11/2013 | Hars | |
| 2005/0273588 A1 | 12/2005 | Ong et al. | |
| 2007/0016787 A1* | 1/2007 | Benedikt | G11B 20/00086 713/176 |
| 2007/0030058 A1 | 2/2007 | Bel | |
| 2007/0067620 A1 | 3/2007 | Jevans | |
| 2008/0235809 A1 | 9/2008 | Weinstein et al. | |
| 2009/0070596 A1 | 3/2009 | Mantin et al. | |
| 2009/0172420 A1* | 7/2009 | Zayas | G06F 21/575 713/194 |
| 2010/0146275 A1* | 6/2010 | Slick | H04L 9/3271 713/169 |
| 2010/0313032 A1 | 12/2010 | Oswalt | |
| 2010/0332724 A1* | 12/2010 | Widergren | G11C 7/16 711/102 |
| 2011/0028125 A1 | 2/2011 | Dehlinger et al. | |
| 2011/0072493 A1* | 3/2011 | Morishita | G06F 21/31 726/3 |
| 2011/0238995 A1 | 9/2011 | Blanco et al. | |
| 2011/0314304 A1 | 12/2011 | Braams | |
| 2012/0221866 A1 | 8/2012 | Flynn | |
| 2012/0278635 A1 | 11/2012 | Hars et al. | |
| 2012/0290809 A1 | 11/2012 | Little et al. | |
| 2013/0073598 A1 | 3/2013 | Jacobson et al. | |
| 2013/0132722 A1 | 5/2013 | Bennett et al. | |
| 2013/0177157 A1* | 7/2013 | Li | H04L 9/083 380/277 |
| 2013/0219189 A1* | 8/2013 | Simmons | G06F 21/00 713/189 |
| 2013/0338886 A1 | 12/2013 | Callea et al. | |
| 2014/0157002 A1 | 6/2014 | Grobman et al. | |
| 2014/0173763 A1* | 6/2014 | Svidenko | G11B 20/0021 726/32 |
| 2015/0154030 A1 | 6/2015 | Schmalz | |
| 2016/0014111 A1* | 1/2016 | Kurz | G06F 21/44 713/172 |

OTHER PUBLICATIONS

Morris Dworkin, "Recommendation for Block Cipher Modes of Operation: The CMAC Mode for Authentication," NIST Special Publication 800-38B, May 2005, 25 pps. Computer Security Division, U.S. Department of Commerce, National Institute of Standards and Technology, US.

Elaine Barker & John Kelsey, "Recommendation for the Entropy Sources Used for Random Bit Generation," NIST Draft Special Publication 800-90B, Aug. 2012, 78 pps, Computer Security Division, U.S. Department of Commerce, National Institute of Standards and Technology, US.

Wikipedia, "Public-key cryptography," https://web.archive.org/web/20131030014147/http://en.wikipedia.org/wiki/Public-key_cr . . . Nov. 19, 2015.

* cited by examiner

FIG. 1

HARD DISC DRIVE (HDD)

STORAGE DEVICE TAMPERING DETECTION

SUMMARY

Various embodiments of the present disclosure are generally directed to an apparatus and method for detecting unauthorized tampering with a storage device.

In accordance with some embodiments, a first identifier value is printed on an external surface of a housing of a storage device and a second identifier value is electronically stored in a memory supported by the housing. A digital signature is generated in response to the first and second identifier values and in response to a private key of a public/private key pair. The digital signature is stored to the storage device by at least one of printing the digital surface to the external surface of the housing or electronically storing the digital signature in the memory. The first and second identifier values and the digital signature are subsequently retrieved from the storage device, and the storage device is authenticated by using the retrieved first and second identifier values and the digital signature, as well as by using a public key of the public/private key pair.

In accordance with other embodiments, a storage device has a housing and a memory supported within the housing. A first identifier value associated with the storage device is printed onto an external surface of the housing. A second identifier value is stored within the memory. The first and second identifier values are combined into a first combined identifier value, and a cryptographic digital signature is generated using a cryptographic signing algorithm based on the first combined identifier value and a private cryptographic key of a private/public key pair. The digital signature is thereafter stored to the storage device. The storage device is subsequently determined to be an authentic device or a counterfeit device by retrieving the first identifier value printed to the external surface of the housing and the second identifier value stored in the memory of the storage device. The retrieved first and second identifier values are combined into a second combined identifier value. A cryptographic verification algorithm operates at least upon the digital signature, the second combined identifier value and a public cryptographic key of the private/public key pair to generate a pass/fail indication signal indicative of the authenticity of the storage device.

In further embodiments, a computer-based apparatus for detecting a counterfeit data storage device has a verification module and a data collection module. The verification module has a processor with associated programming in memory to execute a verification algorithm that provides a pass/fail indication responsive to a public key of a private/public key pair and a digital signature associated with the storage device and generated using a private key of the private/public key pair, a first identifier value stored on an external surface of a housing of the storage device, and a second identifier value stored in a memory within said housing. The data collection module supplies the first identifier value, the second identifier value and the digital signature from the storage device to the verification module.

These and other features and advantages which may characterize various embodiments can be understood in view of the following detailed discussion and the accompanying drawings.

DETAILED DESCRIPTION

Various embodiments of the present disclosure are generally directed to the detection of tampering with storage devices by unauthorized parties.

Storage devices are electronic-based user devices that include digital memory configured to store and retrieve data associated with a user. Storage devices can take a variety of forms. More specific forms of storage devices can include hard disc drives (HDDs), solid-state drives (SSDs), hybrid drives, thumb drives, etc. More generalized forms of storage devices can include laptops, tablets, computers, smart phones, cameras, personal digital assistants, peripherals, music players, gaming consoles, display devices, network appliances, etc.

These and other forms of storage devices are susceptible to tampering ("counterfeiting"). As used herein, the term counterfeiting and the like generally refers to unauthorized efforts made to an existing device to alter the appearance and/or specified characteristics of the device in order to gain an unlawful advantage. While some counterfeiting efforts may employ a change in logo or other alterations to make the device appear to have been obtained from a different source (e.g., ABC Company rather than XYZ Company, etc.), a far more commonly encountered form of counterfeiting involves efforts to alter the characteristics of a given device from a particular source.

Some commonly encountered forms of counterfeiting involve alterations to a failed storage device in an effort to make an older device that has been in the field a sufficient amount of time as to be beyond a stated factory warranty time period to appear to still be within the warranty period. In this way, a counterfeiting party may be able to secure a replacement device or other economic benefit to which the party is not entitled.

Other forms of counterfeiting involve attempts to make a failed device appear to be a different device having a different configuration, capability and/or value. For example, a device label may be altered to make the device appear to be a more recent model, to have a different capacity or performance capabilities, etc. In this way, the counterfeiting party receives a device of greater value and/or capability than what the party was entitled to receive.

Accordingly, various embodiments of the present disclosure are generally directed to an apparatus and method for detecting tampering with storage devices. Embodiments of the disclosed subject matter can be configured as a computer-based toolkit for field deployment by regulatory and investigative personnel, including but not limited to governmental officials who are actively involved in a counterfeiting ring investigation.

A "fake device detection algorithm" scheme employs a digital signature approach using a public/private key pair and input information from the device. Some of the input information is publicly available from the exterior of the device, such as information printed on a device label. Other input information is stored internally within the device and is not generally publicly disclosed or available upon an inspection of the device, such as information stored within a local memory of the device. The processing authenticates the device in a self-contained, fast and efficient manner. The processing does not necessarily require access to a remote server or other computer network, although in some embodiments network access operations can be incorporated into the authentication process.

Figure 1:
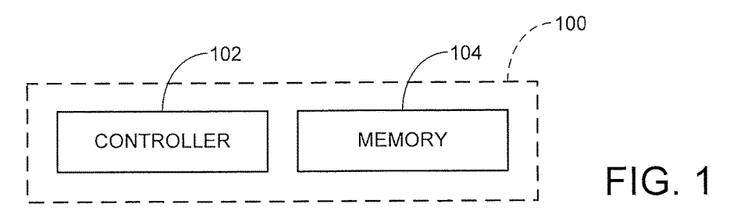
FIG. 1 provides a functional block representation of a storage device in accordance with various embodiments of the present disclosure.

These and other features and advantages of various embodiments of the present disclosure can be understood beginning with a review of FIG. 1 which provides a functional block representation of an exemplary storage device 100. The storage device 100 is shown to include a controller 102 and a memory module 104.

The controller 102 provides top-level control of the device 100 and directs communications and data transfers with a host device (not separately shown). The controller 102 may be realized in hardware, software and/or firmware. The memory module 104 can take a variety of forms, and includes one or more forms of data storage memory to store user data supplied by the host device. Other operative elements can be incorporated into the storage device as required but are omitted for clarity.

Storage devices such as depicted in FIG. 1 can take a variety of forms, including but not limited to hard disc drives (HDDs), solid-state drives (SSDs), hybrid drives, thumb drives, laptops, tablets, computers, smart phones, cameras, personal digital assistants, peripherals, music players, gaming consoles, display devices, network appliances, or any other form of electronic device with the capacity to store data associated with a user of the device.

Figure 2:
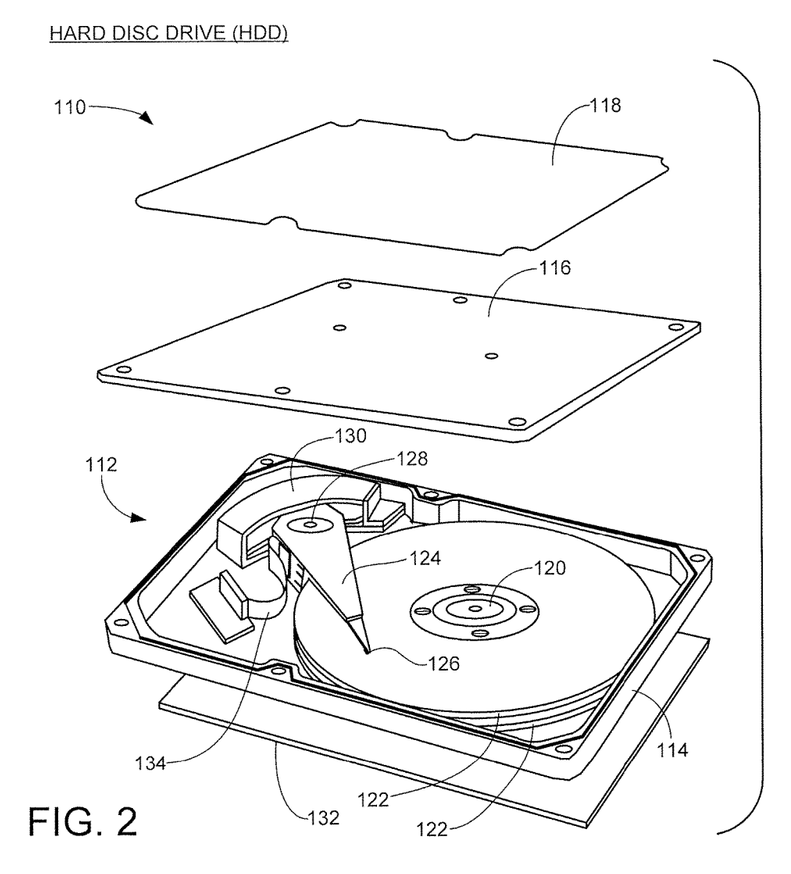
FIG. 2 is an exploded representational view of a data storage device of FIG. 1 characterized as a hard disc drive (HDD).

FIG. 2 shows a storage device 110 generally corresponding to the data storage device 100 of FIG. 1 in accordance with some embodiments. The data storage device 110 in FIG. 2 is characterized as a hard disc drive (HDD) of the type configured to store data from a host device, such as a computer or other host device.

The HDD 110 includes a housing 112 formed from a rigid base deck 114 and top cover 116. An informational and security label 118 is affixed to a top exterior surface of the top cover 116 to provide information associated with the HDD 110 and which is used as discussed below. The label can be adhered to the top cover 116 using a layer of adhesive (not separately shown) or other means.

In some cases, the informational content of the label may directly printed on the external surface of the top cover using a suitable process (e.g., ink jet printing, etching, engraving, molding, machining, etc.) without use of the intervening label 118. It will be appreciated that, for purposes herein, information is "printed" to the external surface if it is physically associated with, supported by or otherwise coupled to the surface, either directly or via a label or other member. Any exterior surface, including exposed top, bottom or side surfaces of either housing member, can constitute the external surface.

A spindle motor 120 is arranged to rotate one or more (in this case, two) magnetic recording media (discs) 122 at a constant high speed during operation of the device 110. An actuator 124 supports a corresponding array of data transducers (read/write heads) 126 adjacent recording surfaces of the media 122. The actuator 124 pivots about a pivot shaft 128 through the controlled application of current to an actuator motor (voice coil motor, VCM) 130.

Control electronics including circuitry corresponding to the controller 102 in FIG. 1 are supported on an HDD printed circuit board assembly (PCBA) 132. The HDD PCBA 132 is mounted to a lower exterior surface of the base deck 114. A flex circuit assembly 136 provides electrical connection paths between the PCBA 132 and the actuator 124.

It will be appreciated that the rotatable media 122, actuator 124, transducers 126 and VCM 130 of FIG. 2 generally correspond to the memory module 104 of FIG. 1, and these elements cooperate to provide a non-volatile main memory store for the device 110. Additional memory, such as in the form of solid state volatile or non-volatile memory, can also be incorporated into the device, such as on the PCBA 132.

Figure 3:
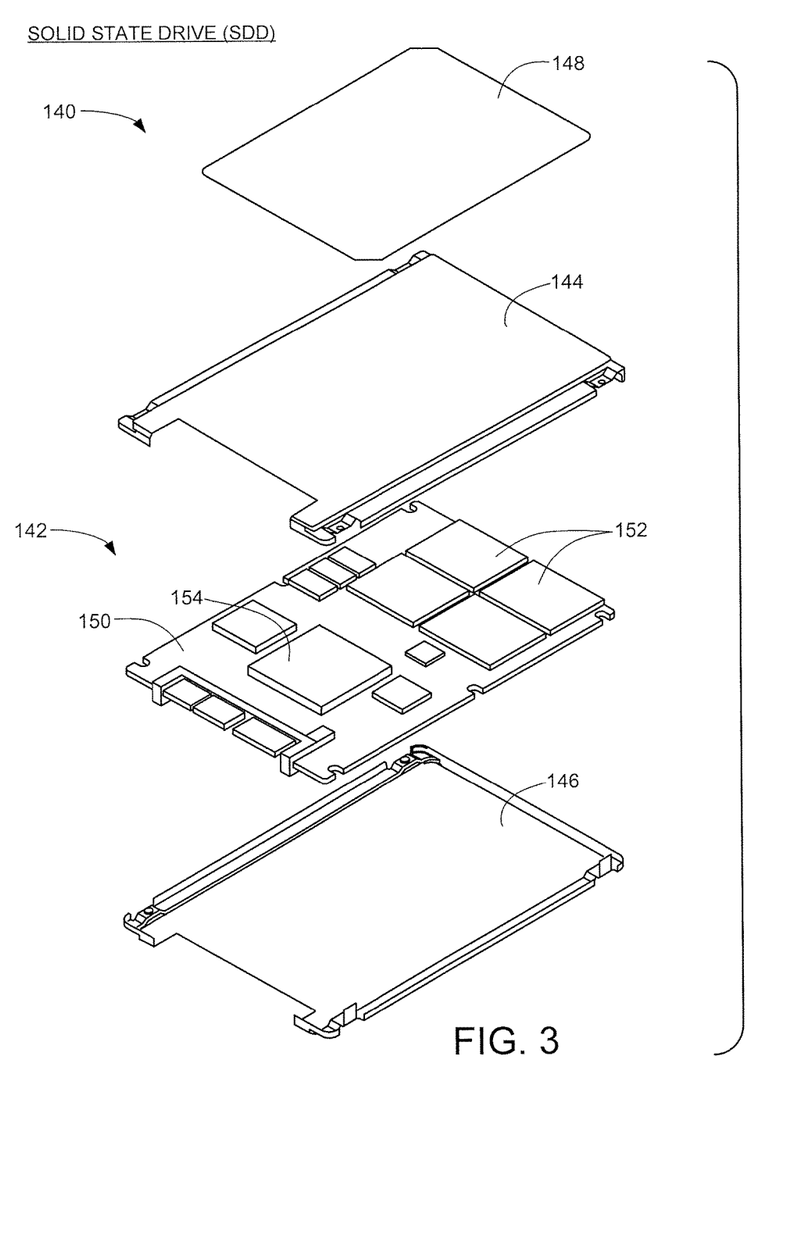
FIG. 3 is an exploded representational view of a data storage device of FIG. 1 characterized as a solid state drive (SSD).

FIG. 3 shows another data storage device 140 generally corresponding to the data storage device 100 of FIG. 1 in accordance with other embodiments. The data storage device 140 in FIG. 3 is characterized as a solid state drive (SSD) of the type used to store user data from a host device such as but not limited to a computer. Unlike the rotatable media of FIG. 2, the SSD 140 generally uses solid state memory in the form of non-volatile NAND flash memory to provide a main non-volatile memory store. Other forms of solid state memory can be used, including but not limited to erasable or rewriteable solid state memory (e.g., NOR flash, STRAM, RRAM, MRAM, FeRAM, etc.).

The SSD 140 includes a rigid housing 142 formed from top and bottom cover plates 144, 146 which mate as shown to form an enclosed environment. As before, an an informational label 148 may be affixed to or otherwise incorporated into a selected cover plate (in this case, the top plate 144).

An SSD PCBA 150 is supported within the housing 142 and includes a number of features including flash memory array integrated circuits (ICs) 152, at least one system on chip (SOC) device 154, and a connector interface 156. A similar interface is incorporated into the HDD 110 but is not visible in FIG. 2.

While the separate housing 142 may provide a number of benefits including environmental protection for the SSD 140, such is merely exemplary and not limiting. Other forms of SSDs are envisioned, including SSDs that are primarily formed of a PCBA such as 150 with other features such as rails to enable securement into an operable environment. It will be appreciated that such SSDs are still provisioned with a "housing" even if such is formed from the body of the PCBA and/or railings, etc. In such case, information as described herein can be readily affixed to such housing components.

Figure 4:
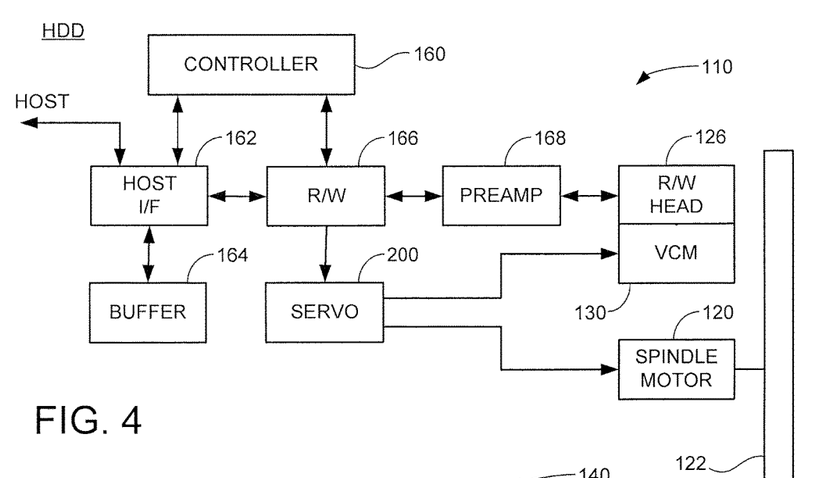
FIG. 4 is a functional block representation of the HDD of FIG. 2 in accordance with some embodiment.
Figure 5:
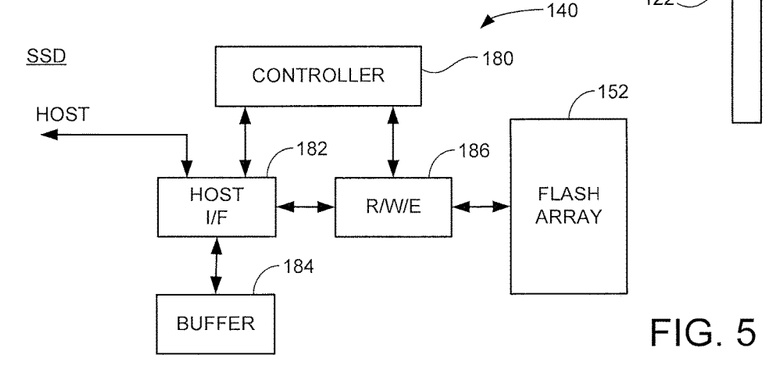
FIG. 5 is a functional block representation of the SDD of FIG. 3 in accordance with some embodiments.

FIGS. 4-5 provide a brief overview of functional aspects of the HDD 110 and SSD 140, respectively. Other features, components and circuits can be incorporated as required. The aspects in FIGS. 4-5 provide exemplary sources of parameters that may be incorporated into the authentication scheme in a manner discussed below.

The HDD 110 in FIG. 4 includes a hardware or firmware/software based controller 160 to provide top level control for the HDD. A host interface (I/F) 162 communicates commands, status information and user data during transfer operations between the HDD 110 and the host using a suitable interface protocol (such as Ethernet, SAS/SATA, etc.). A volatile and/or non-volatile buffer memory 164 facilitates the temporary storage of data, parameters and programming for use during such operations.

A read/write (R/W) channel 166 conditions write data supplied by the host for writing to the rotatable magnetic recording media 122, and performs signal processing on recovered data signals during a read operation to reconstruct previously stored data. A preamplifier/driver (preamp) 168 supplies write currents, read bias currents and signal conditioning as required. A closed loop servo positioning control circuit 170 obtains demodulated servo positioning information from the channel 166 and supplies control inputs to the spindle motor 120 and the VCM 130.

It is contemplated that the controller 160, host I/F 162, buffer 164, R/W channel 165 and servo circuit 170 will be disposed on the HDD PCBA 132 (FIG. 2), and the remaining components in FIG. 4 will be enclosed within the housing 112. Such is merely exemplary and not limiting.

The SSD 140 as depicted in FIG. 5 includes a top level controller 180 which, as before, may be realized in hardware, software and/or firmware. A host I/F 182 communicates with the host using the same or different protocol as in FIG. 4. A buffer memory 184 provides local volatile and/or non-volatile memory during data transfer operations. A read/write/erase (R/W/E) circuit 186 performs appropriate encoding/decoding operations during write and read operations. It is contemplated that each of the components in FIG. 5 will be supported within the housing 142, although as before such is merely exemplary and is not limiting.

At this point it will be appreciated that the data storage device 100 (FIG. 1) can take other forms as well, including but not limited to an optical drive, a hybrid disc drive (with both non-volatile rotatable media and solid-state media), a thumb drive, an internal drive, an external drive, etc. Moreover, the data storage device can be embodied as any number of types of portable electronics with user data storage capabilities including laptops, tablets, computers, smart phones, cameras, personal digital assistants, peripherals, music players, gaming consoles, display devices (e.g., televisions), etc.

Figure 6:
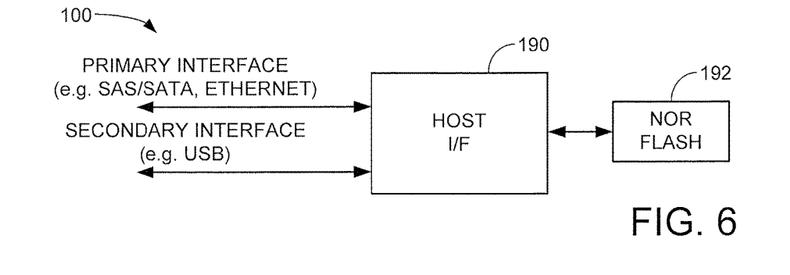
FIG. 6 depicts a host interface (I/F) circuit and local memory in the form of NOR flash useful in the HDD or SDD in some embodiments.

FIG. 6 shows a generalized host I/F circuit 190 that can be incorporated into any of the data storage devices discussed above. The host I/F circuit 190 is adapted to communicate with one or more host devices over a plurality of different interfaces. FIG. 6 shows a primary interface which may take the form of a SAS/SATA interface, an Ethernet interface, etc., and a secondary interface which may take the form of a USB interface, etc. Any number of other forms of wired or wireless interfaces are contemplated, including but not limited to ATA, IDE, FibreChannel, HDMI, Component, Composite, Bluetooth, etc.

In some embodiments, the data storage device 100 further includes a local memory in the form of NOR flash 192. Certain types of control data are stored in the NOR flash 192 and accessed by way of the host I/F during a device authentication operation, as discussed below.

Table I shows an exemplary format for a data structure with various types of identification (ID) values that may be associated with the various data storage devices contemplated above and used during device authentication processing. The number and types of ID values will depend on the requirements of a given application, so the ID values listed in Table I are merely exemplary and are not limiting.

TABLE I

| ID VALUE | DESCRIPTION | ID SIZE | INSIDE? | OUTSIDE? |
|----------|-------------|---------|---------|----------|
| ID 1 | DEVICE ID | 20B | Y | Y |
| ID 2 | COMPONENT 1 | 16B | N | Y |
| ID 3 | COMPONENT 2 | 12B | Y | N |
| ID 4 | PARAMETER 1 | 8B | Y | N |
| . | . | . | . | . |
| . | . | . | . | . |
| ID N | PARAMETER 2 | 4B | Y | N |

A total of N ID values are represented in the table from ID 1 to ID N where N is a plural number. Any suitable numbers and types of ID values can be used. It is contemplated that the ID values will tend to be of the type that may be altered by a motivated counterfeiter, and which, in combination, serve to provide a tamper-proof identifier for each particular device.

Table I includes a generalized description of each of the ID values, an exemplary size (in bytes, B) of the associated ID value, and an indication of whether the associated ID value is located inside (e.g., NOR flash 192, FIG. 6) or outside (e.g., labels 118, 148 in FIGS. 2-3) of the data storage device.

Some ID values, such as the Device ID, may be a unique identifier value associated with the storage device. Other ID values, such as the Component 1 and 2 ID values, may be values associated with components of the storage device. Still other ID values, such as the Parameter 1 and 2 ID values, may be internal parameter settings or values measured during manufacturing processing, testing and/or qualification (see e.g., FIGS. 4-5). It will be noted that any type and arrangement of ID values can be selected, and many such values will occur to the skilled artisan in view of the present disclosure. The ID values may be stored internally within the storage device, externally on the storage device, or both internally and externally, as represented by Table I.

It is contemplated that those ID values stored externally on the device will be stored in a human readable form and will be depicted, for example, using alphanumeric designations (such as in hexadecimal format, alphanumeric format, etc.). Those ID values stored internally within the device will be stored electronically in the form of data values written to digital memory, and may be accessed through a suitable interface (such as the secondary USB interface in FIG. 6).

In other embodiments, the externally stored ID values can be stored in an electronic format, such as but not limited to a two-dimensional bar code, magnetic strip, smart chip, RFID tag, etc. mounted to or incorporated into an external surface of the storage device. It is further contemplated, albeit not necessarily required, that all of the ID values can be obtained without the need to manually open the associated housing (e.g., 112, 142 in FIGS. 2-3) or take other time consuming and potentially damaging operations during evaluation of a given storage device. Opening of the housing or removal of components therefrom, however, can form a part of the authentication process as desired.

Figure 7:
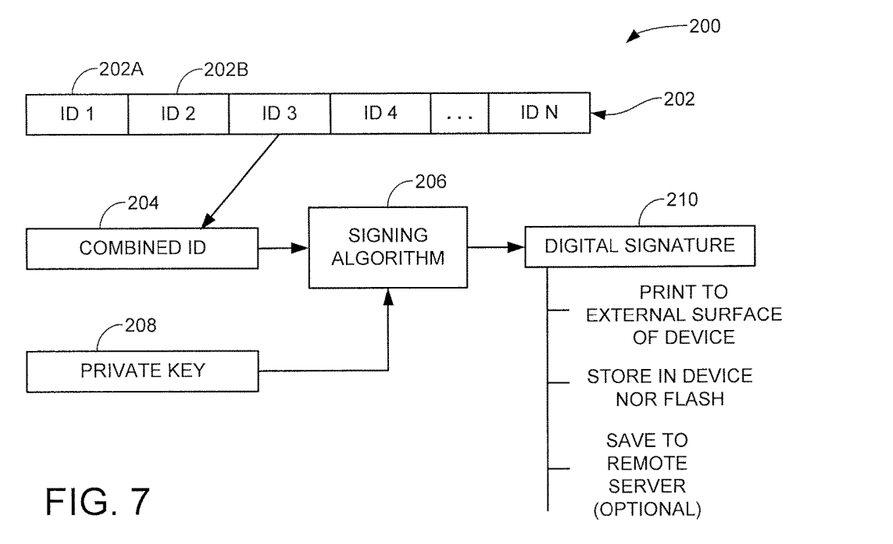
FIG. 7 is a flow diagram illustrating the generation of a cryptographic digital signature for any of the storage devices of FIGS. 1-3 using a cryptographic signing algorithm in accordance with some embodiments.

FIG. 7 is a processing routine 200 which operates to generate a cryptographic digital signature for use during authentication processing in accordance with various embodiments of the present disclosure. It is contemplated that the processing routine 200 is carried out during the manufacturing of a selected storage device, although such is merely exemplary and not necessarily limiting.

A number of ID values 202 associated with the selected storage device are combined to form a combined ID value 204. The ID values 202 may be concatenated or otherwise combined in some suitable fashion and order. The ID values may correspond to those discussed above in Table I. At least some of the ID values (such as ID value 202A) are stored externally on the device and others of the ID values (such as ID value 202B) are stored internally within a memory of the device.

The combined ID value 204 is subjected to a cryptographic signing algorithm 206 that uses a private key 208 of a public/private key pair to generate a cryptographic digital signature 210. The generation of digital signatures such as 210 is well documented and understood in the art. Without limitation, one methodology for generating a digital signature is described including by the United States National Institute of Standards and Technology (NIST) Federal Information Processing Standards Publication (FIPS) 186-4.

The output digital signature 210 may be a multi-bit word of selected length, such as but not limited to 32B (bytes). The digital signature 210 is stored to the selected storage device, such as by printing to an external surface of the storage device and/or storing the digital signature in an internal memory of the device.

In some cases, external printing of the digital signature may include printing a human readable representation (such as in a multi-character alphanumeric string expressed in hexadecimal format) onto the device label (see e.g., labels 118, 148 in FIGS. 2-3), or placing the representation of the digital signature directly onto a cover member of the storage device (e.g., members 114, 116 in FIG. 2; members 144, 146 in FIG. 3) through an etching or similar process. Additionally or alternatively, the digital signature may be printed to the external surface of the storage device in a non-human readable, machine readable format, such as through the use of a two dimensional (2D) barcode, etc.

In addition to storing the digital signature externally, the digital signature may be stored internally as well, such as by being electronically stored in the NOR flash 192 (FIG. 6) or some other suitable memory location within or otherwise supported by the housing. Other possible storage memories for the digital signature may include a radio frequency identification (RFID) tag, a magnetic strip, a smart chip, etc. In some cases, the digital signature may only be stored internally and not be stored externally on the storage device. In further cases, a copy of the digital signature may be stored in a remote server or other network accessible storage location.

Figure 8:
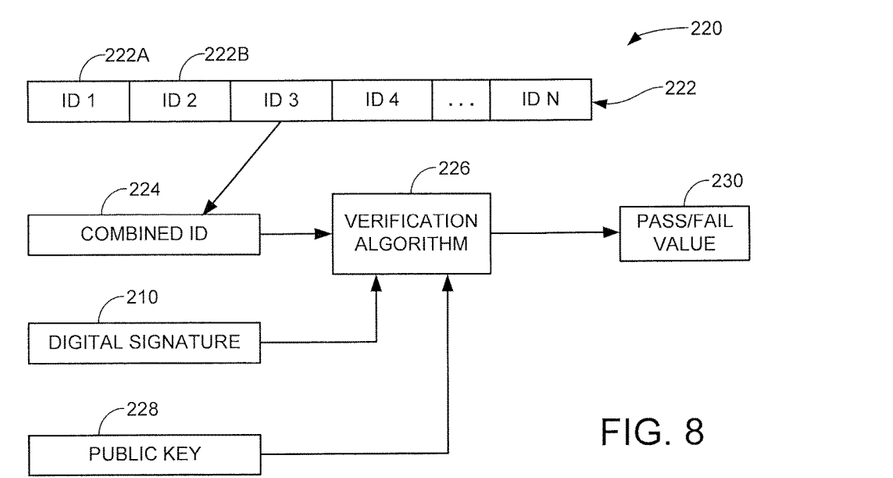
FIG. 8 is a flow diagram illustrating the generation of a pass/fail indication of the authenticity of any of the storage devices of FIGS. 1-3 using the digital signature of FIG. 7.

FIG. 8 depicts a processing routine 220 that may be carried out during subsequent authentication of the device processed in FIG. 7. It is contemplated that the routine 220 may be carried out during subsequent operational life of the device, such as in the context of being presented as a warranty failure device at a failed device collection and evaluation point. The processing operates to authenticate the device, and may be carried out using a portable verification system as will be discussed below.

Generally, the verification processing routine 220 includes entry of a number of ID values 222 associated with the selected storage device. For an authentic device, the ID values 222 will correspond to the ID values 202 in FIG. 7, whereas for a counterfeit device, at least one or more of the ID values 222 may be different as compared to the ID values 220 in FIG. 7.

It is contemplated that at least one of the ID values (such as ID value 222A) will be obtained from the external surface of the device. This can be carried out by a user reading and typing in the ID value(s) into a user interface, by using a reading mechanism to electronically scan an OCR, barcode or other representation of the digital signature from the external surface, etc. At least one other of the ID values (such as ID value 222B) will be obtained from a memory location of the storage device, such as by communicating with and transferring a copy of the ID value(s) from the NOR flash 192, etc.

The retrieved ID values 222 are combined into a combined ID 224, as shown. As before, it is contemplated that for an authentic device the combined ID 224 will nominally correspond to the combined ID value 204, and this will generally not be the case for a counterfeit device.

Before continuing with a discussion of remaining portions of FIG. 8, at this point it will be appreciated that the ID values collected during the input processing portion of the verification routine 220 may include "dummy" ID values that are not actually incorporated into the combined ID value. This can further help to mask the particular values being used to generate the combined ID. Thus, the actual ID values used, the order thereof and the manner in which the ID values are combined will remain unknown to a counterfeiting party.

The generated combined ID value 224 is presented to a verification algorithm 226 of the verification system. The verification algorithm 226 uses a copy of the digital signature 210 from FIG. 7 and a public key 228 of the public/private key pair to generate a pass/fail indication value 230 indicative of the authenticity of the device (e.g., pass=authentic; fail=counterfeit). Verification algorithms such as 226 are well understood in the art and a variety of forms can be used, as discussed above. Generally, the algorithm verifies, through the use of the digital signature and the public key, whether the combined ID 224 matches the combined ID 204.

In some cases, the verification system can provide a visual indication to a user of the system of the results of the verification algorithm. In other cases, the pass/fail value 230 be stored as a flag value written to one or more memory locations. Regardless, the processing of FIGS. 7 and 8 provide an effective and easy to use verification mechanism to allow fast and reliable authentication processing. Advantages of the scheme of FIGS. 7-8 include the fact that existing private/public key pairs can be used, so no new cryptographic keys need to be generated or managed. Security is enhanced in that even if an unscrupulous party obtains a copy of the verification system, no secret information regarding the verification process is leaked.

Some information regarding the underlying ID values being used in the verification processing may be leaked through the digital signature, as well as through the data input collection process. There may also be little confidentiality of the underlying data.

Figure 9:
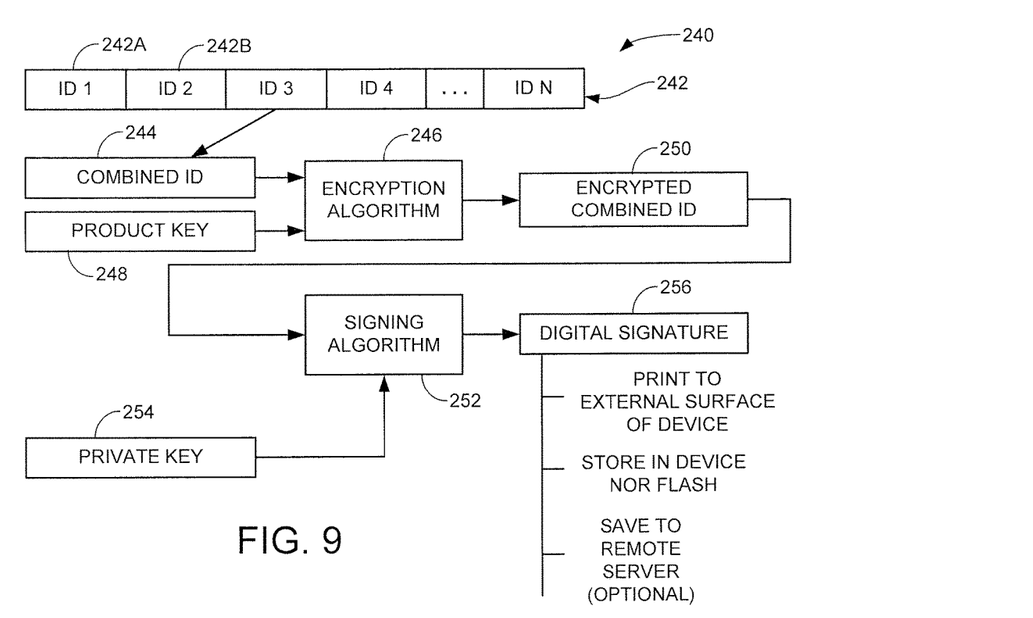
FIG. 9 is a flow diagram illustrating the generation of a cryptographic digital signature for any of the storage devices of FIGS. 1-3 using an encryption algorithm and a cryptographic signing algorithm in accordance with further embodiments.
Figure 10:
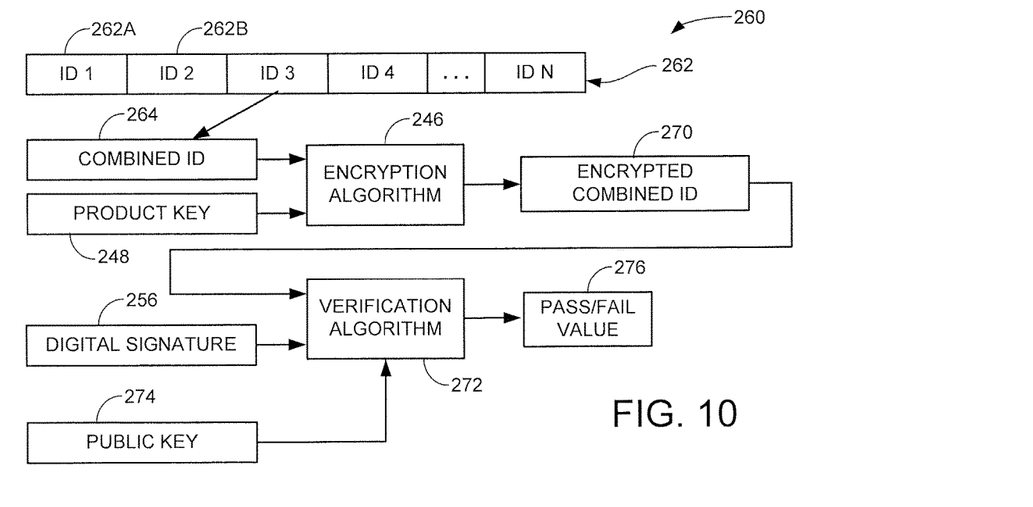
FIG. 10 is a flow diagram illustrating the generation of a pass/fail indication of the authenticity of any of the storage devices of FIGS. 1-3 using the digital signature of FIG. 9.

Accordingly, a related form of signing and verification processing is provided by FIGS. 9-10. More particularly, FIG. 9 presents another processing routine 240 that may be carried out during device manufacturing or at other suitable times. As before, a number of ID values 242 associated with a selected storage device are identified and combined into a combined ID value 244. The ID values 242 include externally stored ID values (e.g., 242A) and internally stored ID values (e.g., 242B). The combined ID value 244 is subjected to an encryption algorithm 246 that encrypts the combined ID value 244 using a cryptographic product key 248 to generate an encrypted combined ID 250.

The encryption algorithm 246 can use any number of suitable encryption methodologies. The product key can be generated using suitable cryptographic key generation techniques, including the use of random or pseudo-random numbers, and may be selected for a particular family of products. Other forms of encryption can be used as desired so the foregoing examples are merely illustrative and are not limiting.

The encrypted combined ID 248 is supplied to a signing algorithm 252 which operates, in conjunction with a private key 254 of a public/private key pair to generate a cryptographic digital signature 256. As discussed above, the digital signature 254 is stored to the storage device such as via printing to an external surface and/or internal electronic storage in a memory location. As desired, a copy of the digital signature can also be stored remotely in a server or other network location.

Verification processing takes place in accordance with a routine 260 in FIG. 10. As before, ID values 262 are retrieved from the storage device and combined to form a combined ID value 264. The retrieved ID values including externally stored ID values (such as 262A) and internally stored ID values (such as 262B).

The same encryption algorithm 246 from FIG. 9 is used in FIG. 10 to encrypt the combined ID value 264 using the product key 248 to form a second encrypted combined ID value 270. Normally, for an authentic device the second encrypted combined ID value 270 will correspond to the first encrypted combined ID value 250 from FIG. 9, and contrawise, for a counterfeit device, the first and second encrypted combined ID values 250, 270 will be different based on differences between the respective ID values 242, 262.

A verification algorithm 272 operates upon the second encrypted combined ID value 270, the digital signature 256 stored in FIG. 9, and a public key 274 of the public/private key pair. The verification algorithm 272 generates a pass/fail value 276 indicative of the status of the storage device (e.g., pass=authentic; fail=counterfeit).

It can be seen from a comparison of FIGS. 9-10 to FIGS. 7-8 that an intermediate encryption step of the combined values is used in the latter (second) scheme. An advantage of the second scheme is that substantially no information leakage will take place with regard to the underlying ID values. However, the second scheme does require management of an additional key (e.g., the product key 248), so that if the verification system is obtained by an unscrupulous party, the product key may be extracted. However, even if the product key is released to the public, the digital signature will still be difficult to forge.

Figure 11:
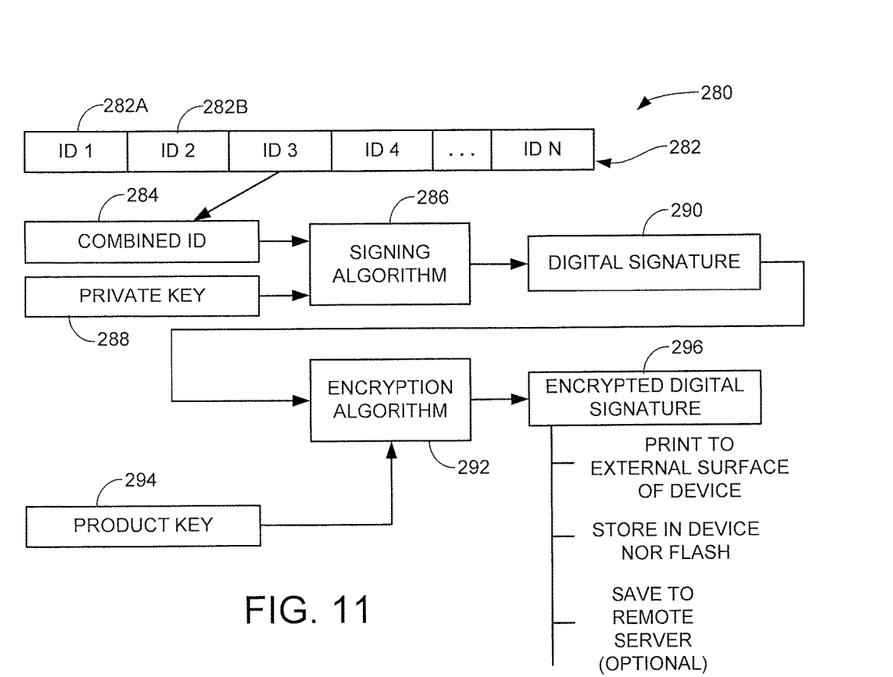
FIG. 11 is a flow diagram illustrating the generation of a cryptographic digital signature for any of the storage devices of FIGS. 1-3 using a cryptographic signing algorithm and an encryption algorithm in accordance with further embodiments.
Figure 12:
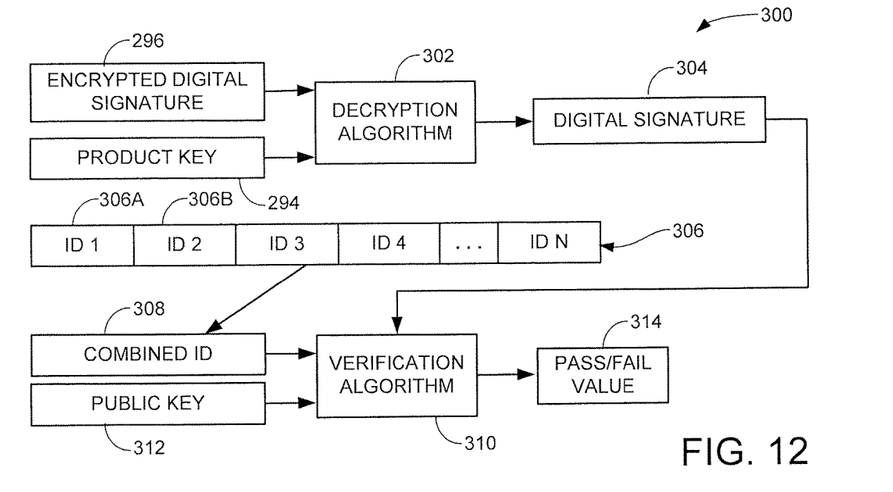
FIG. 12 is a flow diagram illustrating the generation of a pass/fail indication of the authenticity of any of the storage devices of FIGS. 1-3 using the encrypted digital signature of FIG. 11.

FIGS. 11-12 illustrate other signing and verification processing that can be applied for device authentication in some embodiments. Whereas FIGS. 10-11 generally employs an encrypt-then-sign approach, FIGS. 11-12 generally employs a sign-then-encrypt approach.

A processing routine 280 in FIG. 11 combines ID values (ID 1-N) 282 to form a combined ID value 284. As before, the ID values 282 include externally stored values (e.g., 282A) and internally stored values (282B). The combined ID value 284 is digitally signed using a signing algorithm 286 and a private key 288 to form a digital signature 290. The digital signature 290 is encrypted using a suitable encryption algorithm 292 and a product key 294 to generate an encrypted digital signature 296. The encrypted digital signature 296 is thereafter printed to the external surface of the device, stored in a memory within the device and/or stored remotely.

A processing routine 300 of FIG. 12 illustrates processing carried out during a subsequent authentication operation. The encrypted digital signature 296 from FIG. 11 is retrieved and decrypted using a decryption algorithm 302 and the product key 294. This reveals a (decrypted) digital signature 304 which nominally should correspond to the digital signature 290 in FIG. 11.

A number of ID values 306 are retrieved from the device and combined to form a second combined ID value 308. Externally stored ID values include value 306A and internally stored ID values include value 306B. A verification algorithm 310 uses the digital signature 304, the combined ID value 308 and a public key 312 of the public/private key pair to generate a pass/fail value 310 indicative of the status of the device.

Figure 13:
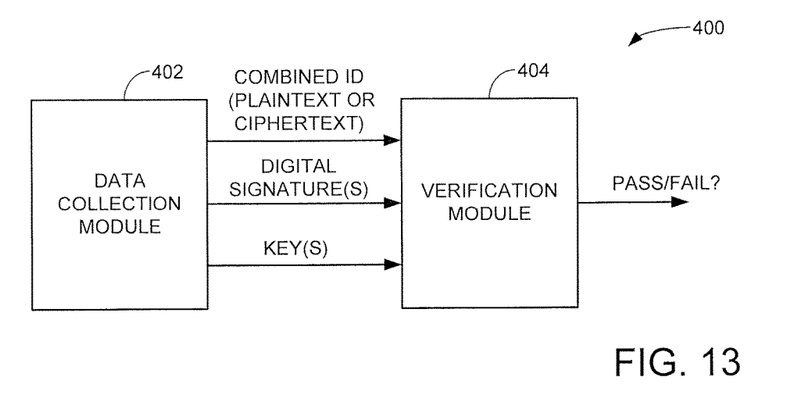
FIG. 13 is a functional block representation of a data storage device authentication system constructed and operated in accordance with various embodiments to authenticate any of the storage devices of FIGS. 1-3.

FIG. 13 is a functional block diagram representation of a device authentication (verification) system 400 constructed and operated in accordance with various embodiments to perform verification processing in accordance with FIGS. 7-12.

The device authentication system 400 includes two primary components: a data collection module 402 and a verification module 404. The data collection module 402 is operable to collect certain data required for the authentication operation, such as the ID values, the digital signatures, the public keys, and, as required, the product keys. In some cases, the data collection module 404 may further operate to generate a combined ID value, an encrypted combined ID value and/or a decrypted digital signature as required. The signing functionality discussed above may also be incorporated into this module. The public and private keys will be stored in the device authentication system 400, although alternatively one or both of these keys may be retrieved from the storage device if suitable protection is supplied thereto.

The verification module 404 generally operates to execute the verification algorithm such as through the use of suitable programming for a programmable processor, as well as to provide the pass/fail indication to the user as a result of the authentication processing.

The data collection module 402 and/or the verification module 404 may be incorporated into a specially configured portable electronic device, such as a tablet, laptop computer, smartphone, etc. to allow ease of use and portability for field use.

Figure 14:
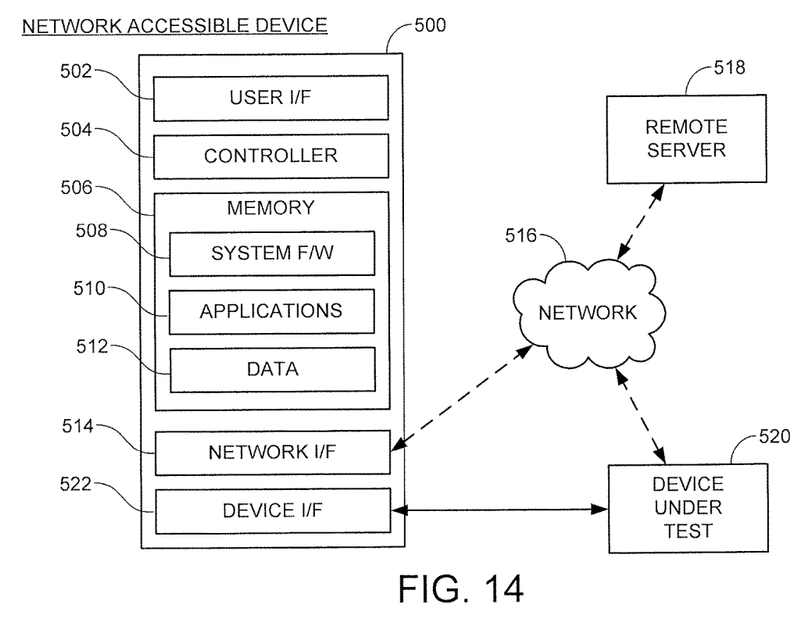
FIG. 14 depicts the data storage device authentication system of FIG. 13 configured as a network accessible device in accordance with some embodiments.

FIG. 14 depicts aspects of the verification system in some embodiments. The system is incorporated into a single, handheld network accessible device 500. The network accessible device 500 will be contemplated, for purposes of the present discussion, as comprising a tablet device with suitable programming applications and external communication ports to enable recovery of the ID values and other required information. Other forms can be used, however.

The network accessible device 500 includes a user interface (I/F) 502, which may include a touch screen, keyboard, mouse, pointer, user selectable buttons, etc. to enable the user to interface with the device. A controller 504 is programmable to provide top level control using data in a memory 506, including system firmware (F/W) 308, one or more applications 510 and data 512. A network I/F 514 provides wired or wireless communication via a network 516 to the remote server 518 as well as, when required, wireless communication with the device under test, DUT (denoted at 520). A direct connection via the secondary interface with the DUT 520 can be established using a device I/F 522.

The user interface 502 may include a touch screen, graphical display, keyboard, mouse, pointer, user controls, and/or other elements to allow a human user to interface with the device. Certain ID values and other information may be entered into the module 500 by the user by way of the user interface 502.

The user interface 502 allows a human user to type, scan, photograph, or otherwise physically manipulate the exterior of the data storage device being evaluated (hereinafter referred to as the "device under test") in order to collect the externally available plaintext data (e.g., device serial number, capacity, model number, etc.) from the label of the device (or other external locations). A graphical user interface (GUI) of the user interface 502 may be supplied with fields to allow the user to quickly identify and enter each of these values. In further cases, the externally printed digital signature may also be manually or electronically entered by the user from the label or other exterior portion of the device housing. While externally available information is contemplated as being obtained via the user interface 502, in other embodiments, the housing may be manipulated (e.g., opened, components removed, etc.) to gain visual or electronic access to some of the data obtained by the user interface.

The device interface 522 may include a USB connection/cable or similar to enable the electronic transfer of the internally available plaintext and stored device signature from the device to the data collection module (FIG. 13). An advantage of using a secondary interface and local memory (e.g., NOR flash, etc.) is that even if the device is inoperable (e.g., a total crash of the rotatable media), the electronically stored data can still be retrieved. In some cases, the internally stored data are stored in multiple redundant locations, and may further be encrypted with a second level of encryption to protect against tampering.

In further cases, the network interface 514 operates, such as via a wireless Internet connection, to access the remote server 518 on which certain information (e.g., the digital signature) is stored. While the verification processing of the present disclosure does not necessarily require network access, it will be appreciated that such access operations can be carried out as required to obtain (or verify) keys, digital signatures, or other product information.

The data collection and verification modules 402, 404 of FIG. 13 may be embodied as applications and/or system firmware 508, 510 in the memory 506 and executed by the device controller 504. It will be noted that the human readable or otherwise externally available ID values may be intermixed with the internally stored ID values, so that the order in which the ID values are collected by the user are not the same order in which the ID values are ultimately combined to form the combined ID value. Redundancy can help in those situations where external (or internal) damage has obscured some of the ID values, or portions thereof. Error correction codes can further be used for the electronically stored values.

While not expressly depicted in FIG. 14, as desired, some or all of the plaintext ID values can also be stored as a backup measure on the remote server 518. These values can also be transferred automatically, or on demand, as required. It will be noted that the remote storage of a redundant copy of the ID values places corruption of these values substantially out of the hands of a counterfeiter, as (nominally) does the internal storage of these values within the device.

Finally, it will be noted that the device under test (DUT) 520 may take the same general form as represented by the network accessible device 500 in FIG. 14. The DUT 520 may be a tablet, smart phone, computer, or other network accessible device with various hardware and software elements as depicted for the network accessible device 500, although the DUT may not necessarily be configured with the requisite programming to carry out the authentication processing discussed herein upon another DUT. Thus, while various embodiments discussed herein have been presented in the context of a HDD and an SDD, as noted above such is merely exemplary and not limiting. Substantially any type of device with user data storage capabilities can be authenticated in accordance with the present disclosure and the claims as set forth below encompass the same. As used herein, the term "memory" will be construed broadly as digital controller accessible memory which can constitute a single device or multiple devices of same or different construction.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

The invention claimed is:

1. A computer-implemented method of detecting a counterfeit storage device, the method comprising:
    printing a first identifier value associated with a first characteristic of the storage device on an external surface of a housing of the storage device;
    electronically storing a second identifier value associated with a second characteristic of the storage device in a memory of the storage device supported by the housing;
    storing one or more dummy identifier values on one or more of the external surface of the housing or the memory, each of the dummy identifier values associated with an additional characteristic of the storage device;
    combining the first and second identifier values in a predetermined order to form a combined identifier value;
    generating a digital signature of the combined identifier value using a private key of a public/private key pair;

storing the digital signature on the storage device by performing at least a selected one of printing the digital signature to the external surface of the housing or electronically storing the digital signature in the memory;

subsequently retrieving from the storage device and storing, in a verification device memory, the first identifier value, the second identifier value, the digital signature and each of the one or more dummy identifier values;

using a verification device processor circuit to combine the first and second identifier values from the verification device memory in the predetermined order to form a retrieved combined identifier value; and authenticating the storage device using the retrieved combined identifier value, the retrieved digital signature and a public key of the public/private key pair.

2. The method of claim 1, wherein the digital signature is generated using a signing algorithm on the combined identifier value.

3. The method of claim 2, further comprising encrypting the combined identifier value to form an encrypted combined identifier value, and applying the signing algorithm to the encrypted combined identifier value.

4. The method of claim 3, wherein the encrypted combined identifier value is formed using an encryption algorithm based on a symmetric secret encryption key.

5. The method of claim 1, wherein the device comprises a primary interface port to facilitate electronic communications with a host in accordance with a first interface protocol and a secondary interface port to facilitate electronic communications with a host in accordance with a different, second interface protocol, and wherein the second identifier value is retrieved from the memory via the secondary interface port.

6. The method of claim 1, wherein the storage device is authenticated using a verification algorithm which generates a pass or fail indication responsive to the retrieved combined identifier value, the digital signature and the public key.

7. The method of claim 6, further comprising encrypting the combined identifier value to generate an encrypted identifier value, wherein the verification algorithm uses the encrypted identifier value as an input.

8. The method of claim 1, wherein the subsequently retrieving step further comprises displaying the digital signature and each of the first, second and each of the one or more dummy identifier values on a graphical user interface display associated with the verification device processor to mask a format of the retrieved combined identifier value.

9. The method of claim 1, wherein the first characteristic of the storage device associated with the first identifier value is a selected one of a unique serial number assigned to the storage device, a model number associated with the storage device or an overall data storage capacity of the memory of the storage device.

10. The method of claim 1, wherein the second characteristic of the storage device associated with the second identifier value is a selected one of a unique serial number of an internal component of the storage device within the housing or a parametric value measured by the storage device.

11. The method of claim 1, wherein the additional characteristic of a selected one of the dummy identifier values is a selected one of a unique serial number assigned to the storage device, a model number associated with the storage device or an overall data storage capacity of the memory of the storage device.

12. A computer-implemented method comprising:

providing a storage device having a housing and a memory supported within the housing;

printing a first identifier value associated with the storage device onto a label affixed to an external surface of the housing;

storing a second identifier value associated with the storage device in the memory;

providing a third identifier value in a selected one of the label or the memory, each of the first, second and third identifier values associated with a different characteristic of the storage device;

combining at least the first identifier value and the second identifier value but not the third identifier value into a first combined identifier value having a predetermined order;

generating a cryptographic digital signature using a cryptographic signing algorithm based on the first combined identifier value and a private cryptographic key of a private/public key pair;

storing the digital signature;

subsequently determining whether the storage device is an authentic device or a counterfeit device by steps comprising:

retrieving, from the storage device to a verification device memory, the first identifier value from the label, the second identifier value from the memory of the storage device, and the third identifier value from the label or the memory of the storage device, and displaying each of the first, second and third identifier values on a user display;

combining at least the retrieved first and second identifier values into a second combined identifier value; and using a verification algorithm stored in a verification device memory and executed by a verification device processor operable at least upon the digital signature, the second combined identifier value and a public cryptographic key of the private/public key pair to generate a pass/fail indication signal indicative of the authenticity of the storage device.

13. The method of claim 12, further comprising encrypting the first combined identifier value using a product key to generate an encrypted combined identifier value, wherein the generating step generates the digital signature using the encrypted combined identifier value and the private key, and wherein the subsequently determining step further comprises encrypting the second combined identifier value using the product key to generate a second encrypted combined identifier value.

14. The method of claim 12, further comprising encrypting the digital signature using a product key to generate an encrypted digital signature, wherein the step of storing the digital signature comprises storing the encrypted digital signature to at least a selected one of the external surface of the housing or the memory.

15. The method of claim 12, wherein the digital signature is printed onto the external surface of the housing by incorporating a human readable representation of the digital signature onto an adhesive label attached to the external surface of the housing.

16. A computer-based apparatus for detecting a counterfeit data storage device, comprising:

a verification module comprising a processor having associated programming in memory to execute a verification algorithm that provides a pass/fail indication responsive to a public key of a private/public key pair, a digital signature generated using a private key of the private/public key pair, a first identifier value stored on an external surface of a housing of the storage device associated with a first characteristic of the storage device, and a second identifier value stored in a memory within said housing associated with a second characteristic of the storage device; and a data collection module which supplies the first identifier value, the second identifier value, at least one or more dummy identifier values associated with additional characteristics of the storage device and the digital signature to the memory of the verification module, the data collection module comprising a human user interface and a storage device interface, the human user interface configured to receive and display input data entered by a human user of the apparatus corresponding to the first identifier value and the at least one or more dummy identifier values from the external surface of the housing, the storage device interface configured to electronically retrieve input data corresponding to the second identifier value stored in the memory.

17. The apparatus of claim 16, the data collection module comprising a graphical user interface display that displays each of the first, second and one or more dummy identifier values in a human readable format.

18. The apparatus of claim 17, wherein the apparatus authenticates the storage device by combining the first and second identifier values supplied by the data collection module in a predetermined order to form a combined identifier value and operating the verification algorithm using the combined identifier value, the digital signature and the public key.

19. The apparatus of claim 16, the processor of the verification module further having associated programming to execute an encryption algorithm using a product key associated with the storage device to encrypt a combined identifier value obtained using the first and second identifier values from the data collection module, the verification algorithm operative upon the encrypted combined identifier value.

20. The apparatus of claim 16, the processor of the verification module further having associated programming to execute a decryption algorithm using a product key associated with the storage device to decrypt the digital signature.

* * * * *